United States Patent [19]

Saito et al.

[11] Patent Number: 4,741,955

[45] Date of Patent: May 3, 1988

[54] PLASTIC OVENWARE HAVING NON-TACKINESS

[75] Inventors: Teruo Saito, Kusatsu; Kuniaki Asai, Tondabayashi; Tadayasu Kobayashi, Ibaraki, all of Japan

[73] Assignee: Sumitomo Chemical Company, Limited, Osaka, Japan

[21] Appl. No.: 832,330

[22] Filed: Feb. 24, 1986

[30] Foreign Application Priority Data

Mar. 1, 1985 [JP] Japan ................... 60-41635

[51] Int. Cl.$^4$ .................. B32B 5/16; B32B 27/08
[52] U.S. Cl. .................... 428/325; 428/421; 428/422; 428/483
[58] Field of Search ............. 428/480, 421, 422, 349, 428/483, 325

[56] References Cited

U.S. PATENT DOCUMENTS 4,021,415 5/1977 Chang ................... 428/480 X
4,143,204 3/1979 Fang .................... 428/422 X
4,219,629 8/1980 Storm ................... 428/421 X
4,477,501 10/1984 Kojima et al. ........... 428/349 X

FOREIGN PATENT DOCUMENTS 84321    6/1980 Japan .................. 428/480
2058102  4/1981 United Kingdom ........ 428/480
2124236  2/1984 United Kingdom ........ 428/480

Primary Examiner—Thomas J. Herbert
Attorney, Agent, or Firm—Stevens, Davis, Miller & Mosher

[57] ABSTRACT

An ovenware having a very fine appearance, improved resistance to staining by foods and improved food releasability and accordingly capable of withstanding repeated use even under very severe conditions can be provided by coating at least the inner surface of an ovenware made from a wholly aromatic polyester or from a composition composed of said wholly aromatic polyester and an inorganic filler material, with a fluoroplastic type coating material.

10 Claims, No Drawings

PLASTIC OVENWARE HAVING NON-TACKINESS

BACKGROUND OF THE INVENTION

1. Field of the Invention

This invention relates to a plastic ovenware.

2. Description of the Prior Art

Ovenwares, namely, cooking vessels used in electronic ovens and subjected to a combination of microwave irradiation and electric heating therein have various requirements such as excellent heat resistance, mechanical strengths, electrical characteristics, resistance to staining by foods and fine appearance. The heat resistance, in particular, needs to be very high because not only high frequency but also electric heating are applied. For instance, ovenwares need to cause no deformation even at 200° to 250° C. and to have practical mechanical strengths.

Wholly aromatic polyesters have various excellent properties owing to their molecular structure and are outstanding among all resins particularly in heat resistance. Of the wholly aromatic polyesters, those produced from terephthalic acid, isophthalic acid, p-hydroxybenzoic acid, or its derivatives, and 4,4'-dihydroxydiphenyl or its derivatives are injection-moldable and excellent in heat resistance, chemicals resistance, radiation resistance, insulation, etc. and accordingly are in extensive use in many fields including electricity and electronics.

Further, the wholly aromatic polyesters, although they have a large dielectric loss tangent of 0.004 to 0.02 similarly to conventional polyesters, have a high crystallinity and a very high heat distortion temperature of 293° C.; therefore, even when a microwave has been applied to them, they stay below the heat distortion temperature and do not deform easily.

Furtheremore, the wholly aromatic polyesters have improved heat resistance, improved rigidity and decreased mold shrinkage when they are blended with a fibrous reinforcing material such as a glass fiber, a carbon fiber or the like or with an inorganic filler material of powder, needle or flake form such as calcium carbonate, magnesium carbonate, aluminum hydroxide, glass beads, titanium oxide, mica, clay, a silica powder, talc, molybdenum disulfide, graphite, wollastonite, a potassium titanate fiber or the like.

However, the wholly aromatic polyesters have various drawbacks. In injection molding, they have a high molding temperature; a slight difference of molding temperature greatly changes the melt viscosity; and they are orientated severely. Moreover, they solidify very quickly in a mold. Therefore, the molded article is high in anisotropy, has non-uniform flow marks in appearance, is poor in surface smoothness and does not look fine. When a food containing an edible oil, vinegar and a sauce is placed in this molded article and in such a state the molded article is subjected to repeated use as an ovenware, staining of the inner surface becomes increasingly severe; an unpleasant odor stays inside; and the non-tackiness of the inner surface deteriorates leading to poor food releasability.

Meanwhile, as disclosed in Japanese Patent Application Kokai (Laid-open) No. 36154/1984, the molded article of wholly aromatic polyester can be remarkably improved in anisotropy and appearance by incorporating talc and titanium oxide of rutile structure into the wholly aromatic polyester. However, the resulting molded article has many fine voids on the surface due to insufficient flow in a mold and this causes detrioration in food releasability when the molded article is subjected to long term use as an ovenware, as seen in a molded article made only from a wholly aromatic polyester. This problem exists also when other fibrous reinforcing material or inorganic filler material is incorporated into a wholly aromatic polyester.

SUMMARY OF THE INVENTION

An object of the present invention is to provide an ovenware excellent in appearance and surface smoothness.

Another object of the present invention is to provide an ovenware having resistance to staining by foods and also having unaltered food releasability when subjected to repeated use over a long period of time.

These objects of the present invention can be attained by coating at least the inner surface of an ovenware made from a wholly aromatic polyester or from a composition composed of said wholly aromatic polyester and an inorganic filler material, with fluoroplastic type coating material.

DETAILED DESCRIPTION OF THE INVENTION

The wholly aromatic polyester used in the present invention is a heat-meltable wholly aromatic polyester having a recurring unit represented by the general formula

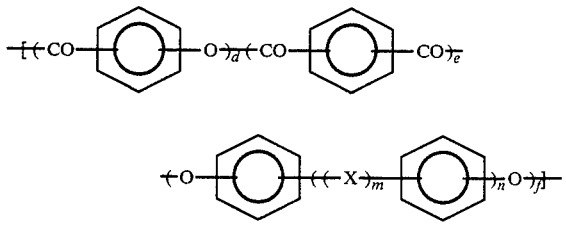

(wherein X is an alkyl group having 1 to 4 carbon atoms, —O—, —SO$_2$—, —S— or —CO—; m and n are each 0 or 1; the ratio of d:e is 1:1 to 10:1; the ratio of e:f is 9:10 to 10:9; and the two substituent groups of each aromatic ring are in para or meta positions). As the components of the wholly aromatic polyester, there can be used, for example, p-hydroxybenzoic acid, m-hydroxybenzoic acid, terephthalic acid, isophthalic acid, hydroquinone, resorcin, 4,4'-dihydroxydiphenyl, 4,4'-dihydroxydiphenyl ether, 4,4'-dihydroxydiphenyl sulfone, 4,4'-dihydroxydiphenyl sulfide, 4,4'-dihydroxybenzophenone, 4,4'-dihydroxydiphenylmethane and their derivatives.

Of the possible combinations of these components, particularly preferable are combinations of p-hydroxybenzoic acid or its ester, terephthalic acid or its ester and 4,4'-dihydroxydiphenyl or its ester. The wholly aromatic polyester used in the present invention can be produced in accordance with processes disclosed in Japanese Patent Application Kokai (Laid-open) Nos. 104932/1981, 44622/1982, etc., but other processes can also be used.

Cooking vessels produced by coating the surface of aluminum with a fluoroplastic type coating material have hitherto been known. However, there is no cooking vessel produced by coating the surface of a plastic food vessel with a fluoroplastic type coating material. It is because the fluoroplastic coating is baked at a high temperature of 200° to 400° C. and only limited plastics can withstand such a high temperature. Wholly aromatic polyesters have very high heat resistance and accordingly, molded articles produced therefrom show a very small weight loss and cause no deformation at the baking temperature of a fluoroplastic type coating material.

The fluoroplastic used in the fluoroplastic type coating material of the present invention refers to a polytetrafluoroethylene, a tetrafluoroethylene-hexafluoropropylene copolymer, a polytrifluorochloroethylene, a tetrafluoroethylene-perfluoroalkyl vinyl ether copolymer, etc. Of these, the polytetrafluoroethylene (hereinafter abbreviated to PTFE) is particularly preferable, because it shows highest non-tackiness.

The fluoroplastic type coating material used in the present invention is a type generally used in applications requiring non-tackiness, releasability, slidability, etc. and is classified into the following two groups.

The first group is obtained by making a fluoroplastic as mentioned above into a coating material. This group is generally available either as a dispersion obtained by concentrating a fluoroplastic of polymer emulsion form together with a surfactant, or as an enamel obtained by adding to said dispersion an organic solvent, a small amount of a pigment, etc. Examples of commercially available dispersions include Polyfuron Dispersions D-1 and D-2, Neofuron Dispersons ND-2 and ND-4, Daifuron Dispersion D-45S (these are products of DAIKIN INDUSTRIES, LTD.), Teflon 30-J (a product of Mitsui Fluorochemical), etc. Examples of commercially available enamels include Polyfuron Enamels E 4100CR, EK-4193CL, ES-5109BK (products of DAIKIN INDUSTRIES, LTD.), etc.

The second group is obtained by making a composition composed of a fluoroplastic as mentioned above and a heat-resistant, film-formable resin into a coating material. This group includes a dispersion obtained by dispersing a fluoroplastic in a solution of a film-formable resin and also a dispersion obtained by dispersing fine powders of a fluoroplastic and a film-formable resin in water or an organic solvent. Said heat-resistant, film-formable resin includes a polyamideimide, a polyimide, their precursors, a polysulfone, a polyphenylene sulfide, a polyetherimide, a silicone resin, etc. Unlike the first group, this group requires no primer at the time of coating and therefore is generally called a one coat type.

Of the above-mentioned film-formable resins, a polyamideimide, a polyimide, their precursors and a polysulfone are particularly preferable. The reason is that these resins can form a highly adhesive and tough film on a wholly aromatic polyester as mentioned above or on a composition composed of the wholly aromatic polyester and an inorganic filler material. Examples of commercially available fluoroplastic type coating materials of the second group include Polyfuron Tough Coat Enamels TC-7109BK, TC-7808GY and TCW-8809BK (products of DAIKIN INDUSTRIES, LTD.), Peslon One Coat (a product of Mie Yushi), Fluon One Coat (a product of ICI), etc.

When the fluoroplastic type coating materials is coated on an ovenware made only from the wholly aromatic polyester, the non-uniform flow marks of the original ovenware can be hidden; the resulting ovenware can have any desired color tone by incorporating an appropriate pigment into the fluoroplastic type coating material; and the new ovenware has excellent resistance to staying by foods and excellent food releasability even when subjected to repeated use under very severe conditions. When the fluoroplastic type coating material coated on an ovenware made from a composition composed of the wholly aromatic polyester and an inorganic filler material, the resulting ovenware is superior in strength, rigidity, high temperature properties and mold shrinkage. As the inorganic filler material, there can be used a glass fiber, glass beads, wollastonite, a potassium titanate fiber, a silica powder, talc, mica, clay, titanium oxide, calcium carbonate, magnesium carbonate, aluminum hydroxide, etc. The filling effect differs by the shape and size of filler used. Of these fillers, wollastonite, a silica powder and talc are particularly preferred in view of the balance between moldability and physical properties (e.g. strength, rigidity and mold shrinkage).

The inorganic filler can be added to the wholly aromatic polyester in any amount unless the moldability of the latter is impaired. The addition amount differs by the type of filler but generally is about 20 to 70% by weight.

The following aromatic polyester or its composition can further contain, one or more ordinary additives such as antioxidant, a heat stabilizer, an ultraviolet absorber, a coloring agent (e.g. a dye or a pigment), a flame-retardant, a flame retardancy aid and an antistatic agent, in such an amount as the objects of the present invention are not impaired.

In producing the ovenware of the present invention, a wholly aromatic polyester alone or a premix obtained by mixing the polyester, an inorganic filler and additives in a Henschel mixer is kneaded in a melt mixer and then converted into pellets. The pellets are subjected to injection molding to mold an ovenware. Then, this ovenware, before being coated with a fluoroplastic type coating material at least the inner surface, namely, the surface to later contact with foods, is preferably subjected to the following pretreatments such as heat treatment, surface roughening treatment and primer treatment.

The heat treatment is preferably conducted at the same temperature as the baking temperature of the fluoroplastic type coating material to be coated later. This heat treatment is not necessary when the baking temperature of the fluoroplastic type coating material is 300° C. or lower. However, when the baking temperature is higher than 300° C., since a slight amount of the decomposition gas formed during molding and contained in the molded article may cause foaming during baking, it is preferable that the heat treatment be conducted initially at a temperature of 200° to 300° C. and then with the temperature being increased stepwise up to the baking temperature. For instance, when the baking temperature of the fluoroplastic type coating material to be coated later is 360° C., it is preferable that the initial heat treatment be conducted at 250° C. for about 2 hours, the next heat treatment be conducted at one or two temperatures between 300° C. and 360° C. for 1 to 5 hours and the final heat treatment be conducted at 360° C. for 1 to 5 hours.

The surface roughening treatment is conducted in order to enhance the adhesiveness of the fluoroplastic type coating material. This treatment is generally conducted by sand blasting but it is unnecessary in ordinary cases. However, for molded articles which are obtained in accordance with injection molding using a large amount of a releasing agent (e.g. silicon) and as a result show a beading phenomenon at the time of coating of a fluoroplastic type coating material, sand blasting is preferably conducted for removing their surface layers.

When a dispersion or enamel of a fluoroplastic is used as the fluoroplastic type coating material, preliminary coating of a fluorine type primer is necessary in order to enhance the adhesiveness of the dispersion or enamel. However, when the fluoroplastic type coating material is used in the form of a coating comprising a fluoroplastic and a heat-resistant, film-formable resin, no primer is necessary because the film-formable resin plays a role of primer. After the pretreatments such as heat treatment, surface roughening treatment and primer treatment have been carried out as above, a fluoroplastic type coating material is applied using a spray gun or the like; the dispersing medium in the coating is removed; then, baking is conducted at a temperature same as or higher than the melting point of the fluoroplastic or at a temperature same as or higher than the melting or curing-/film-forming temperature of the film-formable resin. This is a general process employed in producing the ovenware of the present invention but naturally other processes can also be used.

The ovenware of the present invention need not be coated with the fluoroplastic type coating material at the outer surface, namely, the surface with which foods do not come in direct contact. However, coating of the outer surface with the fluoroplastic type coating material is preferable in order to impart a fine appearance and to make easier the removal of sticked substances formed by boiling over of foods. Since the outer surface does not require food releasability to the same extent as the inner surface does, it is recommendable that the coating of the outer surface be done so as to give a fine appearance and to enhance a commercial value. It can desirably be achieved by coating the outer surface with a composition consisting of a film-formable resin as a base and a small amount (about 2 to 25% by weight) of a fluoroplastic.

As explained above, when the surface of an ovenware made from a wholly aromatic polyester or from a composition composed of said wholly aromatic polyester and an inorganic filler is coated with a fluoroplastic type coating material, the resulting ovenware has an improved appearance and further, owing to the non-tackiness inherently held by the fluoroplastic, has no staining by foods even when subjected to repeated use under very severe conditions as well as excellent food releasability.

The present invention will specifically be explained below by way of Examples. However, these are only illustrative and the present invention is not restricted to them.

EXAMPLE 1

A wholly aromatic polyester having a recurring unit represented by the formula

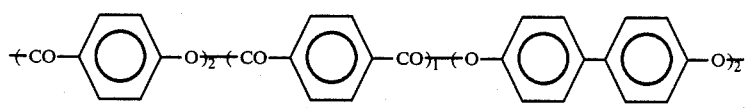

or each mixture consisting of the above wholly aromatic polyester and at least one filler material selected from a glass fiber (REV 8, manufactured by Nihon Glass Seni), wollastonite (NYAD G, sold from Nagase Sangyo), a silica powder (crystalite CMC 12S, manufactured by Tatsumori), talc (Talc S, manufactured by Tatsumori) and titanium oxide (KR 310, manufactured by Titan Kogyo) and having a composition as shown in Table 1 was extruded from a twin screw extruder manufactured by Ikegai Corp. at a temperature of 360° C. and then pelletized to obtain pellets of the wholly aromatic polyester or of each mixture. Using a 1 ounce injection molding machine (Neomat 47/28, manufactured by SUMITOMO HEAVY INDUSTRIES, LTD.), the pellets were molded into test pieces [12.7 mm (width)×127 mm (length)×6.4 mm (thickness)] for measurement of flexural characteristics and heat distortion temperature and also into plates [64 mm×64 mm×3 mm (thickness)] for ovenware test, under conditions of a cylinder temperature of 380° C., an injection pressure of 1,500 kg/cm$^2$, a high injection speed and a mold temperature of 120° C. The test pieces were subjected to measurement of flexural characteristics (ASTM D-790) and heat distortion temperature (ASTM D-648). The measurement results and the appearances of the plates are shown in Table 1. All the test pieces showed a high strength and high heat resistance. Those test pieces containing inorganic fillers showed a high rigidity. Regarding appearance, the plates other than the one containing wollastonite/titanium oxide (the composition F in Table 1) and the one containing talc/titanium oxide (the composition G in Table 1) showed formation of non-uniform flow marks. The non-uniform flow-marks were striking in the plate containing no filler (the composition A in Table 1).

Each plate prepared above was subjected to a heat treatment at 250° C., 300° C., 330° C. and 360° C. in this order for each 2 hours. Then, on each plate was spray-coated a fluorine type primer (Polyfuron Enamel EK-1908 GY, manufactured by DAIKIN INDUSTRIES, LTD.), and the primer was dried at 100° C. for 20 minutes. Thereon was further spray-coated a PTFE enamel (Polyfuron Enamel EK-4193CL, manufactured by DAIKIN INDUSTRIES, LTD.), and the plate temperature was increased from room temperature to 360° C. in about 1 hour and baking was conducted at 360° C. for 30 minutes, whereby each plate had a film of about 25μ in thickness. All the plates obtained had a good appearance of chocolate color and had neither foam nor warpage.

Each of these plates was placed at the bottom of a Pyrex tray. On the plate was placed 5 g of an absorbent cotton containing 50 g of an edible oil. Then this tray system was placed on the turn table of an electronic oven (Model NE-8300, manufactured by Matsushita Electric Industrial Co., Ltd.) capable of generating a microwave of 2,450 mega Hz and also electrically heating up to 250° C. and was subjected to a 5 cycle heating test. (One cycle consisted of 10 minutes of microwave irradiation, 20 minutes of heating at 250° C. by a 600 W heater and cooling in this order.) After the test, the absorbent cotton on the plate carbonized in a black color but could easily be removed from the plate, in all the cases. The plate surface after removal of the carbonized absorbent cotton was water-washed using a sponge impregnated with a liquid detergent and observed. The surface had neither swelling nor staining, in all the cases.

removed and there was neither swelling nor staining on the plate surface.

TABLE 1

| Composition No. | Type and amount of filler (wt %) | Flexural characteristics | | | Heat distortion temperature 18.6 kg/cm$^2$ (°C.) | Appearance of plate (Before coating of fluoroplastic type costing material) |
| --- | --- | --- | --- | --- | --- | --- |
| | | Strength (kg/cm$^2$) | Breaking strain (%) | Modulus of elasticity (kg/cm$^2$) | | |
| A | No filler | 810 | 3.2 | 52,000 | 293 | x |
| B | Glass fiber, 40 | 1,080 | 2.4 | 103,000 | >300 | Δ |
| C | Wollastonite, 40 | 1,060 | 2.3 | 110,000 | >300 | Δ |
| D | Silica powder, 40 | 860 | 2.6 | 75,000 | >300 | Δ |
| E | Talc, 40 | 850 | 2.2 | 90,000 | >300 | Δ |
| F | Wollastonite/ titanium oxide, 40/10 | 1,090 | 1.9 | 120,000 | >300 | o |
| G | Talc/titanium oxide, 40/10 | 800 | 1.8 | 96,000 | >300 | o | o: Almost no flow mark and fine appearance.
Δ: Few flow marks and slightly poor appearance.
x: Many flow marks and poor appearance.

EXAMPLE 2

Plates of 64 mm×64 mm×3 mm (thickness) made from the compositions A to G of Table 1, respectively, were subjected to the same heat treatment as in Example 1. On each of the resulting plates was spray-coated a polyether sulfone/PTFE coating material (PTFE content: about 50% by weight) (Fluon One Coat, manufactured by ICI). The coated plate was heated from room temperature to 360° C. in about 1 hour and baking was conducted at 360° C. for about 30 minutes, whereby a film of about 20μin thickness was formed on the plate. All the plates had a good appearance of dark chocolate color and had neither foam nor warpage.

These plates were subjected to the same 5 cycle heating test by electronic oven as in Example 1. In all the cases, the carbonized absorbent cotton could easily be removed and there was neither swelling nor staining on the plate surface.

EXAMPLE 3

A polyphenylene sulfide (Ryton PPS V-1, manufactured by Philips) was ground using a jet mill (I-5 Type, manufactured by Nihon Pneumatic) to obtain a powder having an average particle diameter of about 5μ. 42 Parts of this polyphenylene sulfide fine powder, 2 parts of carbon and 60 parts of an aqueous solution containing 5% of sodium lauryl sulfate were kneaded for about 7 hours in a ball mill. Thereto was added 58 parts of a PTFE enamel (Polyfuron Enamel E-4100 CR, manufactured by DAIKIN INDUSTRIES, LTD.) and they were mixed to prepare a polyphenylene sulfide/PTFE coating material (PTFE content: about 40% by weight).

Plates of 64 mm×64 mm×3 mm (thickness) made from the compositions C to E of Example 1, respectively, were subjected to a heat treatment consisting of 250° C.×2 hours and subsequently 300° C.×1 hour. On each of the resulting plates was spray-coated the above prepared coating material. The coated plate was heated from room temperature to 300° C. in about 40 minutes and baking was conducted at 300° C. for 30 minutes, whereby a film of about 20μ in thickness was formed on the plate. All the plates had a good appearance of black color and had neither foam nor warpage.

These plates were subjected to the same 5 cycle heating test by electronic oven as in Example 1. In all the cases, the carbonized absorbent cotton could easily be removed and there was neither swelling nor staining on the plate surface.

EXAMPLE 4

25 Parts of a polyimide (Kelimide 601 manufactured by Mitsui Petrochemical Industries, Ltd.) was dissolved in 60 parts of N-methylpyrrolidone. Thereto was slowly added 20 parts of a fine powder of PTFE (Fluon L169J manufactured by Asahi Glass Co., Ltd.) with stirring with a dissolver. They were mixed thoroughly. Thereto were further added each 10 parts of xylene and methyl ethyl ketone to prepare a polyimide/PTFE coating material (PTFE content: about 44% by weight).

Plates of 64 mm×64 mm×3 mm (thickness) made from the compositions C to E of Example 1, respectively, were spray-coated with the above prepared coating material. Each of the coated plates were heated from room temperature to 260° C. in about 1 hour and baking was conducted at 260° C. for 30 minutes, whereby a film of about 20μ in thickness was formed on the plate. All the plates had a good appearance of yellowish brown color and had neither foam nor warpage.

These plates were subjected to the same 5 cycle heating test by electronic oven as in Example 1. In all the cases, the carbonized absorbent cotton could easily be removed and there was neither swell nor staining on the plate surface.

EXAMPLE 5

100 Parts of a polyamideimide solution (a xylene solution of HI-400 manufactured by Hitachi Chemical Co. Ltd.) and 80 parts of a tetrafluoroethylene-hexafluoropropylene copolymer dispersion (Neofuron Dispersion ND-2 manufactured by DAIKIN INDUSTRIES, LTD.) were thoroughly mixed to prepare a polyamideimide/tetrafluoroethylenehexafluoropropylene copolymer coating material (fluoroplastic content: about 40%).

Plates of 64 mm×64 mm×3 mm (thickness) made from the compositions C to E of Example 1, respectively, were subjected to a heat treatment of 250° C. for 2 hours, 300° C. for 1 hour and 330° C. for 1 hour in this order. On each of the resulting plates was spray-coated the above prepared coating material. The coated plate was heated from room temperature to 330° C. in about 1 hour and baking was conducted at 330° C. for 30 minutes, whereby a film of about 15μ in thickness was formed on the plate. All the plates had a good appearance and had neither foam nor warpage.

These plates were subjected to the same 5 cycle heating test by electronic oven as in Example 1. In all the cases, the carbonized absorbent cotton could easily be removed and there was neither swell nor staining on the plate surface.

EXAMPLE 6

The same test as in Example 4 was conducted except that the fine powder of PTFE used in Example 4 was replaced by the same tetrafluoroethylene-hexafluoropropylene copolymer dispersion as used in Example 5. The substantially same results as in Example 4 were obtained.

COMPARATIVE EXAMPLE 1

Plates of 64 mm×64 mm×3 mm (thickness) made from the compositions A to G of Example 1, respectively, were subjected, without coating them, to the same 5 cycle heating test by electronic oven as in Example 1. As a result, in the plates made from the compositions A to E, the carbonized absorbent cotton sticked to the plate and could not be removed.

On the other hand, in the plates made from the compositions F and G, the carbonized absorbent cotton could be removed but the staining caused by penetration of carbonized oil into the porous layer of the plate surface could not be removed completely even by water-washing with a sponge impregnated with a liquid detergent.

EXAMPLE 7

6 Containers each of 96 mm in lower diameter, 175 mm in upper diameter, 50 mm in height and 2.5 mm in thickness were molded from the composition C of Example 1, using a 10 ounce injection molding machine (N140A manufactured by Nikko) at the cylinder temperature of 360° C. Then, they were subjected to a heat treatment of 250° C. for 3 hours, 300° C. for 2 hours, 330° C. for 2 hours and 360° C. for 2 hours in this order. On the inner and outer surfaces of each of the resulting containers were coated coating materials having a composition shown in Table 2 to form a film, in the same manner as in Examples 1 to 6.

300 g Of a chicken meat was placed in each of the above prepared container. Then, each container was put on the turn table of the same electronic oven as in Example 1 and subjected to a 7 cycle heating test. (1 cycle consisted of 7 minutes of microwave irradiation, 10 minutes of electric heating at 250° C. and cooling.) In each container, the chicken scorched and sticked to the inner surface of container but could easily be taken out of the container. An oil presumed to have derived from the checken sticked to the inner surface of each container after removal of chicken. The same oil also sticked to part of the outer surface. However, these oils could easily be removed by water-washing with a liquid detergent, except the oil sticked to the outer surface of the container a (regarding this a, reference is made to Table 2). The outer surface of the container a required the detergent of 2 times the amount for the outer surface of other containers but the oil could be removed completely. After water washing, there was neither smell nor staining on all the containers.

The above procedure was applied also to the compositions B, D and E of Example 1. The results were same as above.

TABLE 2

| Container | Inner surface | Outer surface |
|---|---|---|
| a | PTFE only | — |
| b | PTFE only | PTFE only |
| c | PTFE/polyether sulfone = 50/50 | PTFE/polyether sulfone = 5/95 |
| d | Same as above | PTFE/polyether sulfone = 10/90 |
| e | Same as above | PTFE/polyether sulfone = 20/80 |
| f | PTFE/polyamide-imide = 40/60 | PTFE/polyamideimide = 15/85 |

COMPARATIVE EXAMPLE 2

6 Different containers molded from the compositions B to G of Example 1, respectively, were subjected, without coating them, to the same 7 cycle heating test as in Example 7. In the containers made from the compositions B to E, the chicken sticked slightly to the inner surface and could not be taken out after about the 5th and later cycles. In the containers made from the compositions F and G, the chicken could easily be taken out even after completion of the 7th cycle, but staining could not be removed completely by washing.

EXAMPLE 8

400 g Of a curry stew was placed in each of the containers a to e of Example 7. The stew in each container was irradiated with a microwave for 10 minutes; was freezed in the freezing compartment of a refrigerator; and was thawed and warmed by 10 minutes of microwave irradiation. This procedure was repeated 10 times. Then, the stew was taken out of each container and the container was water-washed with a liquid detergent for observation of the surface. In all the containers, there was no surface change and no remaining smell.

COMPARATIVE EXAMPLE 3

Containers molded from the compositions F and G of Example 1, respectively, were subjected, without coating them, to the same test as in Example 8. Even after thorough washing, their surfaces had a slightly yellowish color and there remained a slight odor of curry.

What is claimed is:

1. A plastic ovenware having non-tackiness, comprising a substrate made from a wholly aromatic polyester having a recurring unit represented by the general formula:

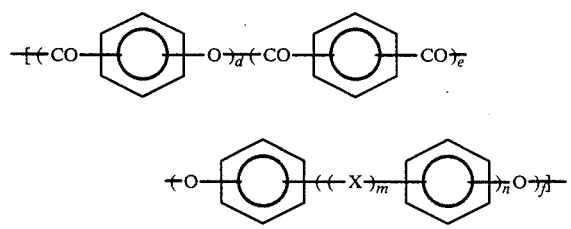

wherein X is an alkyl group having 1 to 4 carbon atoms, —O—, —SO$_2$—, —S— or —CO—; m and n are each 0 or 1; the ratio of d:e is 1:1 to 10:1; the ratio of e:f is 9:10 to 10:9; and the two substituent groups of each aromatic ring are in para or meta positions or from a composition composed of said wholly aromatic polyester and an inorganic filler material, and a surface coating comprising a fluoroplastic type coating material.

2. A plastic ovenware according to claim 1, wherein the inorganic filler material is a glass fiber, glass beads, wollastonite, a potassium titanate fiber, a silica powder, talc, mica, clay, titanium oxide, calcium carbonate, magnesium carbonate, or aluminum hydroxide.

3. A plastic ovenware according to claim 1, wherein the wholly aromatic polyester is condensed from at least one compound selected from each of the groups consisting of p-hydroxybenzoic acid, m-hydroxybenzoic acid and their derivatives; terephthalic acid, isophthalic acid and their derivatives; and hydroquinone, resorcin, 4,4'-dihydroxydiphenyl, 4,4'-dihydroxydiphenyl ether, 4,4'-dihydroxydiphenyl sulfone, 4,4'-dihydroxydiphenyl sulfide, 4,4'-dihydroxybenzophenone, 4,4'-dihydroxydiphenylmethane and their derivatives, respectively.

4. A plastic ovenware according to claim 3, wherein the wholly aromatic polyester is a combination of p-hydroxybenzoic acid or its ester, terephthalic acid or its ester and 4,4'-dihydroxydiphenyl or its ester.

5. A plastic ovenware according to claim 1, wherein the fluoroplastic type coating material is obtained by making a composition composed of fluoroplastic and a heat-resistant, film-formable resin into a coating material.

6. A plastic ovenware according to claim 5, wherein the heat-resistant, film-formable resin is a polyamideimide, a polyimide, their precursors, a polysulfone, a polyphenylenesulfide, a polyetherimide, or a silicone resin.

7. A plastic ovenware according to claim 5, wherein the fluoroplastic is a polytetrafluoroethylene, a tetrafluoroethylene-hexafluoropropylene copolymer, a polytrifluorochloroethylene, or a tetrafluoroethyleneperfluoroalkyl vinyl ether copolymer.

8. A plastic ovenware according to claim 7, wherein the fluoroplastic is polytetrafluoroethylene.

9. A plastic ovenware according to claim 1, wherein the fluoroplastic is a polytetrafluoroethylene, a tetrafluoroethylene-hexafluoropropylene copolymer, a polytrifluorochloroethylene, or a tetrafluoroethyleneperfluoroalkyl vinyl ether copolymer.

10. A plastic ovenware according to claim 9, wherein the fluoroplastic is polytetrafluoroethylene.

* * * * *